United States Patent
Bakeev

(10) Patent No.: US 12,000,015 B2
(45) Date of Patent: Jun. 4, 2024

(54) METHOD OF IMPROVING GOLD RECOVERY IN A CYANIDE LEACHING CIRCUIT

(71) Applicant: SOLENIS TECHNOLOGIES, L.P., Wilmington, DE (US)

(72) Inventor: Kirill N. Bakeev, Newark, DE (US)

(73) Assignee: Solenis Technologies, L.P., Wilmington, DE (US)

(*) Notice: Subject to any disclaimer, the term of this patent is extended or adjusted under 35 U.S.C. 154(b) by 557 days.

(21) Appl. No.: 17/216,789

(22) Filed: Mar. 30, 2021

(65) Prior Publication Data

US 2021/0301371 A1 Sep. 30, 2021

Related U.S. Application Data

(60) Provisional application No. 63/001,615, filed on Mar. 30, 2020.

(51) Int. Cl.
*C22B 3/06* (2006.01)
*C22B 11/00* (2006.01)

(52) U.S. Cl.
CPC ............... *C22B 3/06* (2013.01); *C22B 11/04* (2013.01)

(58) Field of Classification Search
CPC . C22B 3/06; C22B 11/04; C22B 11/08; Y02P 10/20
See application file for complete search history.

(56) References Cited

U.S. PATENT DOCUMENTS

| | | | |
|---|---|---|---|
| 4,816,234 A | 3/1989 | Brison et al. | |
| 5,073,354 A | 12/1991 | Fuller et al. | |
| 5,196,052 A | 3/1993 | Gross et al. | |
| 5,368,830 A | 11/1994 | Alfano et al. | |
| 6,238,632 B1 | 5/2001 | Kamps | |
| 8,435,382 B2 | 5/2013 | Lu et al. | |
| 9,719,008 B2* | 8/2017 | Bakeev | C22B 3/02 |
| 2016/0298209 A1* | 10/2016 | Mujicic | C22B 3/06 |

FOREIGN PATENT DOCUMENTS

| | | | |
|---|---|---|---|
| RU | 2559453 C2 | 8/2015 | |
| WO | 2011075650 A2 | 6/2011 | |
| WO | WO-2013019627 A1 * | 2/2013 | ............... C02F 5/10 |
| WO | 2015035297 A1 | 3/2015 | |

OTHER PUBLICATIONS

Dunne, Robert C. Kawatra, S. Komar Young, Courtney A . . . (2019). SME Mineral Processing & Extractive Metallurgy Handbook—72.1 Process Description—CIL and CIP. Society for Mining, Metallurgy, and Exploration (SME). (Year: 2019).*
Dunne, Robert C. Kawatra, S. Komar Young, Courtney A . . . (2019). SME Mineral Processing & Extractive Metallurgy Handbook—29.1.1 Autogenous and Semiautogenous Milling. Society for Mining, Metallurgy, and Exploration (SME). (Year: 2019).*
ISA/US, International Search Report and Written Opinion issued in Int. Appl. No. PCT/US2021/024773 dated Jun. 9, 2021.
Anon, "Elution and Carbon Reactivation", Metalliferous Mining—Processing, 2016.
W. Stange, "The Process Design of Gold Leaching and Carbon-in-Pulp Circuits", The South African Institute of Mining and Metallurgy, 1999. SA ISSN 0038-223X.
John Rogans, "Activated Carbon in Gold Recovery", Marketing Director Kemix (Pty) Ltd, Jun. 22, 2012.
David Michaud, "Discrepancy Between Actual and Expected Recovery: Gold Metallurgy Accounting", Gold Metallurgy Accounting; 911metallurgist.com/blog/discrepancies-recovery-theoretical-extraction-goldmetallurgy-accounting; Sep. 7, 2016.
Asker et al., "Gold Absorption from Alkaline Aurocyanide Solution by Neutral Polymeric Adsorbents", Solvent Extraction and Ion Exchange, 4(3), 531-546, 1986.

* cited by examiner

*Primary Examiner* — Anthony J Zimmer
*Assistant Examiner* — Zachary John Baum
(74) *Attorney, Agent, or Firm* — Lorenz & Kopf, LLP

(57) ABSTRACT

This disclosure provides a method of improving gold recovery in a cyanide leaching circuit comprising a gold ore slurry. The method includes the step of providing a gold recovery additive chosen from polyacrylic acid, copolymers of acrylic acid and a sulfonated co-monomer, and combinations thereof, wherein the additive has a weight average molecular weight of from about 500 to about 10,000 g/mol. The method also includes the step of combining the gold recovery additive with the gold ore slurry in the cyanide leaching circuit, wherein the gold recovery additive is present in an amount of from about 10 to about 1000 g per ton of dry gold ore to improve the recovery of gold from the gold ore slurry.

20 Claims, No Drawings

METHOD OF IMPROVING GOLD RECOVERY IN A CYANIDE LEACHING CIRCUIT

CROSS-REFERENCE TO RELATED APPLICATIONS

This application claims the benefit of U.S. Provisional Application No. 63/001,615, filed Mar. 30, 2020, which is incorporated by reference herein in its entirety.

TECHNICAL FIELD

The present disclosure generally relates to a method of improving gold recovery in a cyanide leaching circuit. More specifically, this disclosure relates to combination of a particular gold recovery additive with a gold ore slurry to improve the recovery of gold from the gold ore slurry.

BACKGROUND

Cyanide leaching has been the industry standard for gold processing for more than 100 years. During the cyanide leach process (also known as gold cyanidation), a cyanide leaching solution, or lixiviant, is percolated through gold containing ore. The gold present in the ore is dissolved by the cyanide to form a pregnant leach solution. The gold is then recovered from the pregnant leach solution using activated carbon or resins. This cost-effective, proven method of gold extraction provides maximum recovery for many gold ores, including low grade and some refractory ores.

Gold cyanidation includes a series of steps that vary depending on the characteristics of ore and the type of mine. This process typically begins with mined gold ore being crushed and ground in order to make the gold more accessible. Subsequently, the crushed ore may then be agglomerated in an agglomeration drum (e.g. an ore drum or agglomerator) prior to leaching, often referred to as heap leaching. Agglomeration creates more uniformly shaped and sized particles so that the leaching agent can more effectively percolate through the ore particles.

The ground ore can be also in the form of slurry and through reaction with added cyanide leaching solution, typically sodium or potassium cyanide, gold can be extracted from ore to form an aqueous solution of a cyanide-gold complex. Activated carbon is mixed with the pregnant leaching solution to recover gold. The gold is then adsorbed onto the surface of the activated carbon, which is then described as loaded. The gold can then be desorbed from the loaded carbon in a process known as elution or stripping which produces a high gold concentrate solution from which gold can be obtained.

There are various processes that can be used with gold cyanidation including Carbon-in-Leach (CIL) and Carbon-in-Pulp (CIP) processes. Carbon-in-pulp (CIP) processes include a sequential leach then adsorption of gold from gold containing ore. During CIP, ground ore slurry flows through several agitated tanks where sodium/potassium cyanide and oxygen have been added to dissolve the gold into solution. In the adsorption stage, this solution flows through several agitated tanks containing activated carbon. Gold adsorbs on to the activated carbon, which flows counter-current to the ore slurry, while screens separate the barren ore from the gold-loaded carbon.

Carbon-in-leach (CIL) processes include a simultaneous leach and adsorption process. The simultaneous leach and adsorption phases of the CIL process were developed for processing gold ores that contain robbing materials such as natural absorptive carbon. These reduce the gold yield by attracting gold meant for the activated carbon. Simultaneous leaching and adsorption help minimize the problem. During the CIL process, both cyanide leaching and carbon adsorption take place in the same tanks. During the CIP process, first leaching occurs then carbon adsorption take place while leaching continues.

In these methods, gold extraction percentages are far from 100% efficient. Accordingly, there is an opportunity for improvement. Furthermore, other desirable features and characteristics of the present disclosure will become apparent from the subsequent detailed description of the disclosure and the appended claims, taken in conjunction with the accompanying drawings and this background of the disclosure.

BRIEF SUMMARY

This disclosure provides a method of improving gold recovery in a cyanide leaching circuit comprising a gold ore slurry. The method includes the step of providing a gold recovery additive chosen from polyacrylic acid, copolymers of acrylic acid and a sulfonated co-monomer, and combinations thereof, wherein the additive has a weight average molecular weight of from about 500 to about 10,000 g/mol. The method also includes the step of combining the gold recovery additive with the gold ore slurry in the cyanide leaching circuit, wherein the gold recovery additive is present in an amount of from about 10 to about 1000 g per ton of dry gold ore to improve the recovery of gold from the gold ore slurry.

Gold and other precious and base metals efficient extraction and recovery are important for achieving return on investment for mining industry, particularly, in present situation, when higher quality ores become scarcer and mines are struggling to generate significant profit. The data set forth in this disclosure demonstrate that using particular additives can significantly improve gold recovery when added directly to a cyanide leaching circuit, e.g. gold ore slurry in cyanide leaching tanks containing active carbon, in mining. The effect relates to wt. % gold ore slurry in water and tends to improve at higher slurry wt. %. This discovered effect is not obvious because the presence of any additives in leaching circuits typically is not desirable due to potential additive adsorption onto carbon thereby blocking the active carbon surface and preventing, or at least minimizing, gold recovery via gold-cyanide complex adsorption onto active carbon. This is known in the industry as carbon "poisoning" or a CIL "poisoning" effect. The gold recovery poisoning effect could be also manifested via additive competitive interaction with cyanide, thereby minimizing cyanide efficiency in gold extraction. Hence, the instant selected additive unexpectedly improves recovery is, indeed, superior to known methods and additives.

DETAILED DESCRIPTION

The following detailed description is merely exemplary in nature and is not intended to limit the instant method. Furthermore, there is no intention to be bound by any theory presented in the preceding background or the following detailed description.

Embodiments of the present disclosure are generally directed to methods of gold recovery from ore. For the sake of brevity, conventional techniques related to such methods may not be described in detail herein. Moreover, the various tasks and process steps described herein may be incorporated into a more comprehensive procedure or process having additional steps or functionality not described in detail herein. In particular, various steps in the recovery of gold from ore are well-known and so, in the interest of brevity, many conventional steps will only be mentioned briefly herein or will be omitted entirely without providing the well-known process details.

This disclosure provides a method of improving gold recovery in a cyanide leaching circuit comprising a gold ore slurry. The method includes the step of providing a gold recovery additive chosen from polyacrylic acid, copolymers of acrylic acid and a sulfonated co-monomer, and combinations thereof, wherein the additive has a weight average molecular weight of from about 500 to about 10,000 g/mol. The method also includes the step of combining the gold recovery additive with the gold ore slurry in the cyanide leaching circuit, wherein the gold recovery additive is present in an amount of from about 10 to about 1000 g per ton of dry gold ore to improve the recovery of gold from the gold ore slurry. In various non-limiting embodiments, all values and ranges of values both whole and fractional between and including those set forth above are hereby expressly contemplated for use.

In various embodiments, the method includes one or more steps of crushing and/or screening gold containing ore. For example, gold-containing ore may be crushed and/or screened using any method known in the art. For example, a crusher and vibrating screen can be used such that the bulk ore (e.g. up to 650 mm) can be broken into smaller sizes (e.g. about 10 mm or even smaller). One or more than one stage of crushing and screening can be used, as chosen by one of skill in the art. In some instances, three or four stages of crushing and screening are used.

After crushing and screening, the gold containing ore may be ground and classified. After grinding and classification, the ore material can meet the requirements of leaching (e.g. 85-95% through 200 mesh). In a typical process, a grate ball mill and a spiral classifier constitute the first stage grinding and classification unit, and an overflow ball mill and a hydro-cyclone can constitute the second stage grinding and grading unit. However, any equipment known in the art can be used. Gravity separation processes may also be utilized.

Subsequently, leaching and adsorption processes can be utilized. There are several desorption methods that are typically used which may include, but are not limited to, a Zadra desorption method, a high temperature and high pressure desorption method (hereinafter referred to as HTHP method), and an integral pressure desorption method. In other embodiments, CIL and/or CIP processes can be used.

In still other embodiments, a Carbon-In-Pulp (CIP) process and apparatus is used. Carbon-in-pulp operations are variations of a conventional cyanidation process. Ore is crushed, finely ground, and cyanide leached in a series of agitated tanks to solubilize the gold values. Instead of separating solids from the pregnant solution, as in the traditional cyanidation process, granular activated carbon is added to the leached slurry. The carbon adsorbs the gold from the slurry solution and is removed from the slurry by coarse screening. In practice, this is accomplished by a series of five or six agitated tanks where carbon and ore slurry are contacted in a staged countercurrent manner. This greatly increases the possible gold loading onto the carbon while maintaining a high recovery percentage. Carbon is retained within the individual CIP tanks by CIP tank screens. The opening size of the CIP tank screens is such that the finely ground ore particles will pass through the screens, but the coarse carbon will not.

In still other embodiments, a Carbon-In-Leach (CIL) process and apparatus is used. The carbon-in-leach process integrates leaching and carbon-in-pulp into a single unit process operation. Leach tanks are fitted with carbon retention screens and the CIP tanks are eliminated. Carbon is added in leach so that the gold is adsorbed onto carbon almost as soon as it is dissolved by the cyanide solution. The CIL process is frequently used when native carbon is present in the gold ore. This native carbon will adsorb the leached gold and prevent its recovery. This phenomenon is referred to commonly as "preg-robbing". The carbon added in CIL is more active than native carbon, so the gold will be preferentially adsorbed by carbon that can be recovered for stripping. The CIL process will frequently be used in small cyanide mills to reduce the complexity and cost of the circuit. There are several disadvantages to CIL compared with CIP. Carbon loading will be 20 to 30% less than with CIP, which means more carbon has to be stripped. (This disadvantage may be overcome by a hybrid circuit, incorporating a cross between CIL and CIP.) The CIL process requires a larger carbon inventory in the circuit, which results in a larger in-process tie up of gold. The larger carbon inventory can also result in higher carbon (and gold) losses through carbon attrition.

In various embodiments, CIL processes utilize many tanks, e.g. about 6 to about 10 stages of tanks. Sodium cyanide (or some other leaching reagent) solution is typically added into the first tank and gold starts to be leached. In many instances, activated carbon is added to the second and subsequent tanks, A carbon segregation screen is typically set in every adsorption tank outlet to separate the carbon and slurry. Slurry typically flows automatically from the first tank to the last one based on the height difference of each stage of tank, while the activated carbon flow reversely through an air lifter. For this reason, the activated carbon is added into the slurry at the last adsorption tank and gold-loaded activated carbon is taken out at the first adsorption tank. After screening and washing, the gold-loaded activated carbon can be sent to a desorption operation. After adsorption, the gold grade in a tailing solution will reduce to from about 0.03 to 0.01 g/m$^3$. More specifically, in various embodiments, gold-loaded carbon and slurry are lifted by carbon pump or air-lifter to a separation sieve. Gold-loaded carbon and slurry can then be separated by water on a sieve surface such that gold-loaded carbon is sent to a carbon storage tank and the slurry and water flow into the first adsorption tank.

Referring back, the instant disclosure can include any one or more of the aforementioned process types, steps, and components. The instant method improves gold recovery in a cyanide leaching circuit. In various embodiments, this improvement is from about 1 to about 10, about 2 to about 9, about 3 to about 8, about 4 to about 7, about 5 to about 6, or about 1, 2, 3, 4, 5, 6, 7, 8, 9, or 10, percent increase in gold recovery. In various non-limiting embodiments, all values and ranges of values both whole and fractional between and including those set forth above are hereby expressly contemplated for use.

The instant method utilizes a gold ore slurry which may also be described as a gold containing slurry or slurry. The gold ore slurry is not particularly limited and may be any known in the art. For example, the gold ore slurry may be described based on grind and/or leach densities. Grind density is typically defined as wt. % ore solids in the slurry in a grinding mill, e.g. a Ball mil, Sag mill, Rod mill, etc. during grinding operations, as is understood by those of skill in the art. Grind density can also be defined as wt. % ore solids in a lab mill during a lab grinding test, as is understood by those of skill in the art. Leach density is typically defined as wt. % ore solids in a slurry in the leaching vessel, e.g. a CIL or CIP tank during leaching operations. Leach density can also be defined as wt. % ore solids in the bottle during a bottle roll leaching lab test, as is understood by those of skill in the art. In various embodiments, the gold ore slurry may have a grind density of from about 50 to about 80, about 55 to about 75, about 60 to about 70, or about 65 to about 70, percent of solids based on a total weight of the slurry. In other embodiments, the gold ore slurry may have a leach density of from about 25 to about 50, about 30 to about 45, or about 35 to about 40, percent of solids based on a total weight of the slurry. In various non-limiting embodiments, all values and ranges of values both whole and fractional between and including those set forth above are hereby expressly contemplated for use.

Leaching gold in ore slurry can be impacted by state of ore agglomeration. Without intending to be limited by theory, it is thought that if there is minimal agglomeration, then additive benefits are also minimized. For example, with higher ore agglomeration, leaching efficiency can be reduced. The chosen additive will likely deagglomerate ore slurry resulting in increased gold recovery. It is also hypothesized that recovery benefit is proportional to degree of deagglomeration of the particles in the leaching circuit. Particle sizes in the leaching circuit are typically much smaller than those in a grinding circuit, as is known in the art. In the instant disclosure, the particle size of the ore in the leaching circuit may be chosen by one of skill in the art. In various embodiments, the particle size of the ore in the leaching circuit is from about 10 to about 100, about 15 to about 95, about 20 to about 90, about 25 to about 85, about 30 to about 80, about 35 to about 75, about 40 to about 70, about 45 to about 65, about 40 to about 60, about 55 to about 60, micrometers. In other embodiments, the particle size of the ore in the leaching circuit is from about 10 to about 150, micrometers. In various embodiments, the particle size is from about 105 to about 145, about 110 to about 140, about 115 to about 135, about 120 to about 130, or about 125 to about 130, micrometers. In various non-limiting embodiments, all values and ranges of values both whole and fractional between and including those set forth above are hereby expressly contemplated for use.

Referring back, the instant method includes the step of providing a gold recovery additive chosen from polyacrylic acid, copolymers of acrylic acid and a sulfonated co-monomer, and combinations thereof. In one embodiment, the additive is polyacrylic acid which is formed from monomers of acrylic acid which are polymerized. In other embodiments, the sulfonated co-monomer is chosen from 2-acrylamido-2-methylpropane sulfonic acid, 2-methyl-2-propene-1-sulfonic acid, and combinations thereof. In various embodiments, the additive is a co-polymer of acrylic acid polymerized with 2-acrylamido-2-methylpropane sulfonic acid. In another embodiment, the additive is a co-monomer of acrylic acid polymerized with 2-methyl-2-propene-1-sulfonic acid. In another embodiment, the additive is a co-polymer of acrylic acid polymerized with 2-acrylamido-2-methylpropane sulfonic acid and 2-methyl-2-propene-1-sulfonic acid.

Typically, the additive has a weight average molecular weight of from about 500 to about 10,000 g/mol. In various embodiments, the weight average molecular weight is from about 1000 to about 9500, about 1500 to about 9000, about 2000 to about 8500, about 2500 to about 8000, about 3000 to about 7500, about 3500 to about 7000, about 4000 to about 6500, about 4500 to about 6000, about 5000 to about 5500, about 1000 to about 6000, about 1500 to about 5500, about 2000 to about 5000, about 2500 to about 4500, about 3000 to about 3500, about 4000 to about 6000, about 4500 to about 5500, or about 5000, g/mol. In various non-limiting embodiments, all values and ranges of values both whole and fractional between and including those set forth above are hereby expressly contemplated for use.

Referring back, the method also includes the step of combining the gold recovery additive with the gold ore slurry in the cyanide leaching circuit, wherein the gold recovery additive is present in an amount of from about 10 to about 1000 g per ton of dry gold ore to improve the recovery of gold from the gold ore slurry. In various embodiments, the additive is present in an amount of from about 25 to about 975, about 50 to about 950, about 75 to about 925, about 100 to about 900, about 125 to about 875, about 150 to about 850, about 175 to about 825, about 200 to about 800, about 225 to about 775, about 250 to about 750, about 275 to about 725, about 300 to about 700, about 325 to about 675, about 350 to about 650, about 375 to about 625, about 400 to about 600, about 425 to about 575, about 450 to about 550, about 475 to about 525, about 475 to about 500, about 100 to about 700, about 600 to about 650, about 625 to about 650, about 600 to about 625, or about 600, 625, or 650, g per ton of dry gold ore. In various non-limiting embodiments, all values and ranges of values both whole and fractional between and including those set forth above are hereby expressly contemplated for use.

Any of the conditions used in the instant method that are not further specified herein may be chosen by one of skill in the art.

In one embodiment, the step of combining occurs in a leaching tank of a carbon-in-leach process. In another embodiment, the step of combining occurs in a carbon-in-pulp process. Each of these processes may be any of the type known in the art.

In another embodiment, the step of combining occurs during a step of slurry pumping in the cyanide leaching circuit of a carbon-in-leach process. In another embodiment, the step of combining occurs during a step of slurry pumping in the cyanide leaching circuit of a carbon-in-pulp process. Each of these processes may be any of the type known in the art.

In various non-limiting embodiments, it is contemplated that any one or more process steps, components, or parameters utilized herein may be as described in one or more of:
(1) Anon, (2016), "Elution and Carbon Reactivation", Metalliferous Mining—Processing;
(2) The Process Design Of Gold Leaching And Carbon-In-Pulp Circuits; The South African Institute of Mining and Metallurgy, 1999. SA ISSN 0038-223X;
(3) Activated Carbon In Gold Recovery, John Rogans, Marketing Director Kemix (Pty) Ltd Date: 22 Jun. 2012; and/or
(4) Discrepancy Between Actual and Expected Recovery: Gold Metallurgy Accounting; 911metallurgist.com/blog/discrepancies-recovery-theoretical-extraction-gold-metallurgy-accounting; Sep. 7, 2016,
each of which is expressly incorporated herein in its entirety by reference in these various non-limiting embodiments.

In additional embodiments, the gold recovery additive and/or the gold ore slurry and/or the entire method are free of an oil. This oil may be any known in the art including, but not limited to, organic synthetic and/or naturally occurring oils. For example, this oil may be a high terpene-containing natural oil such as those natural oils having a terpene content of at least about 50% or 90%. Suitable high terpene-containing natural oils include, but are not limited to, citrus peel oil, which includes, but is not limited to, orange peel oil (i.e., orange oil), grapefruit peel oil (i.e., grapefruit oil), and lemon peel oil (i.e., lemon oil), pine oil, and combinations thereof. The oils are preferably excluded because they can interfere with activated carbon adsorption and desorption. In other embodiments, the gold recovery additive and/or the gold ore slurry and/or the entire method are free of a cationic surfactant. This cationic surfactant may be any known in the art including, but not limited to, an alkyl trimethyl quaternary ammonium salt, an alkyl dimethyl benzyl quaternary ammonium salt, a dialkyl dimethyl quaternary ammonium salt, an imidazolinium salt, and combinations thereof. These are typically excluded because they can interact with cyanide and interfere with gold leaching by cyanide. The terminology "free of" may describe embodiments that include less than 5, 4, 3, 2, 1, 0.5, 0.1, 0.05, or 0.01, weight percent of the oil and/or cationic surfactant, based on a total weight of the additive, slurry, or additive and slurry together. In other embodiments, one or more of the additive, slurry, or method as a whole is entirely free of the oil and/or the cationic surfactant.

In an additional embodiment, the step of combining occurs in a leaching tank of a carbon-in-leach or carbon-in-pulp process, wherein the gold ore slurry has a leach density of from about 25 to about 50 percent based on a total weight of the slurry, wherein the gold slurry has a grind density of about 60 percent based on a total weight of the slurry, and wherein the gold recovery additive and the gold ore slurry are free of an oil and a cationic surfactant.

In another additional embodiment, the step of combining occurs in a leaching tank of a carbon-in-leach or carbon-in-pulp process, wherein the gold ore slurry has a leach density of from about 25 to about 50 percent based on a total weight of the slurry, wherein the gold slurry has a grind density of about 60 percent based on a total weight of the slurry, wherein the gold recovery additive is polyacrylic acid having a weight average molecular weight of about 2,000 to about 4,000 g/mol, and wherein the gold recovery additive and the gold ore slurry are free of an oil and a cationic surfactant.

In a further additional embodiment, the step of combining occurs in a leaching tank of a carbon-in-leach or carbon-in-pulp process, wherein the gold ore slurry has a leach density of from about 25 to about 50 percent based on a total weight of the slurry, wherein the gold slurry has a grind density of about 60 percent based on a total weight of the slurry, wherein the gold recovery additive is polyacrylic acid having a weight average molecular weight of about 2,000 to about 4,000 g/mol, wherein the gold recovery additive is present in an amount of about 625 g per ton of dry ore, and wherein the gold recovery additive and the gold ore slurry are free of an oil and a cationic surfactant.

In yet another additional embodiment, leaching processes are widely used and tend to be suitable for the treatment of oxidized gold ore with low sulfur content and mud content. Generally, the proportion of gold and silver does not exceed 1:5. In various embodiments, the best conditions for these processes include a pH of from about 10 to about 12, a (sodium) cyanide concentration of not less than about 0.015 wt. %, a particle size of activated carbon of from about 1.0 to about 3.35 mm, coconut shell activated carbon, and a slurry concentration of from about 40 to about 45%.

EXAMPLES

A series of Examples are formed and evaluated using a Metallurgical Laboratory Standard Bottle Roll Leach Test Procedure set forth below. More specifically, the various examples are created and evaluated to determine the effect of the instant additive on the recovery of gold from various slurries of 60% grind density and varying leach densities.

| Example | Gold Recovery Additive | Weight of Gold Recovery Additive | Grind Density | Leach Density | % Recovery Actual | Average % Recovery Actual |
|---|---|---|---|---|---|---|
| Example 1A | PAA; Mw ~2,000-4,000 | 625 g/ton of dry ore | 60% | 40% | 79.4% | — |
| Example 1B | PAA; MW ~2,000-4,000 | 625 g/ton of dry ore | 60% | 40% | 79.4% | — |
| Example 1C | PAA; Mw ~2,000-4,000 | 625 g/ton of dry ore | 60% | 40% | 77.5% | — |
| Example 1D | PAA; Mw ~2,000-4,000 | 625 g/ton of dry ore | 60% | 40% | 81.3% | — |
| Example 1E | PAA; Mw ~2,000-4,000 | 625 g/ton of dry ore | 60% | 40% | 81.3% | — |
| Example 1F | PAA; Mw ~2,000-4,000 | 625 g/ton of dry ore | 60% | 40% | 75.6% | 79.1% |
| Control Example 1A | Modified Lignosulfonate | ~625 g/ton of dry ore | 60% | 40% | 77.5% | — |
| Control Example 1B | Modified Lignosulfonate | ~625 g/ton of dry ore | 60% | 40% | 77.5% | — |
| Control Example 1C | Modified Lignosulfonate | ~625 g/ton of dry ore | 60% | 40% | 71.9% | — |
| Control Example 1D | Modified Lignosulfonate | ~625 g/ton of dry ore | 60% | 40% | 73.8% | — |
| Control Example 1E | Modified Lignosulfonate | ~625 g/ton of dry ore | 60% | 40% | 73.8% | — |

-continued

| Example | Gold Recovery Additive | Weight of Gold Recovery Additive | Grind Density | Leach Density | % Recovery Actual | Average % Recovery Actual |
|---|---|---|---|---|---|---|
| Control Example 1F | Modified Lignosulfonate | ~625 g/ton of dry ore | 60% | 40% | 73.8% | 74.7% |
| Control Example 1G | None | None | 60% | 40% | 81.3% | — |
| Control Example 1H | None | None | 60% | 40% | 77.5% | — |
| Control Example 1I | None | None | 60% | 40% | 77.5% | — |
| Control Example 1J | None | None | 60% | 40% | 79.4% | — |
| Control Example 1K | None | None | 60% | 40% | 75.6% | — |
| Control Example 1L | None | None | 60% | 40% | 73.8% | 77.5% |
| Example 2A | PAA; Mw ~2,000-4,000 | 625 g/ton of dry ore | 60% | 25% | 66.3 | — |
| Example 2B | PAA; Mw ~2,000-4,000 | 625 g/ton of dry ore | 60% | 25% | 66.3 | 66.3 |
| Control Example 2A | None | None | 60% | 25% | 63 | — |
| Control Example 2B | None | None | 60% | 25% | 65.2 | 64.1 |
| Example 3A | PAA; Mw ~2,000-4,000 | 625 g/ton of dry ore | 60% | 50% | 69.6 | — |
| Example 3B | PAA; Mw ~2,000-4,000 | 625 g/ton of dry ore | 60% | 50% | 68.5 | 69.05 |
| Control Example 3A | None | None | 60% | 50% | 62 | 62 |

In the above table, PAA is polyacrylic acid having a weight average molecular weight (Mw) of from about 2,000 to about 4,000 g/mol.

The Metallurgical Laboratory Standard Bottle Roll Leach Test Procedure used to test the aforementioned Examples is described in detail below.

Standard Mine Bottle Roll Leach Test Conditions are as Follows:
1. Approximately 600 gram test heads;
2. Grind at 60% solids by weight to 35%+100 mesh;
3. 25% solids by weight leach slurry density;
4. 2.0 lb./ton solution NaCN concentration;
5. 11.3 pH adjusted with reagent grade lime;
6. NaCN concentration and pH adjustments at 4 and 24 hours;
7. Ambient temperature; and
8. 48 hour retention time Sample Preparation Crush an entire bulk sample using a laboratory jaw crusher. Operate the crusher in closed circuit with a Gilson vibratory screening plant with a 6-mesh screen. Return oversize material to the jaw crusher and continue the process until approximately 95 wt. % of the total sample passes the screen. Add the small volume of remaining oversize material to the minus 6-mesh size fraction.

Following the crushing stage, reduce sample quantity to between 25 and 50 lbs. via riffle splitting. Using a 20-cup rotary splitter, blend the 25 to 50 lb. sample fraction. Empty the rotary splitter cups one-by-one into a pan on a balance until the pan contains 26.43 lbs., the weight required for 20 each 600 gram test heads. Reject the excess material.

Return the 26.43 lbs. to the rotary splitter. Following a second rotary splitter stage, place the contents of each of the 20 cups in plastic sample bags marked with sample description and weight. Split one the 20 samples into two fractions. Submit approximately 150 grams for assay while using the remaining approximately 450 grams for moisture determination.

Grind Time Determination

Select and record the weights of three median-weight test heads for product size vs. grind time testing. Grind tests are carried out using a lab-scale rod mill with slurry density at 60% solids by weight. Water addition weight is calculated as follows:

$$W = S \div 0.6 - S$$

Where: W=water addition weight in grams
S=head sample weight in grams

If exact slurry density is desired, sample moisture should be deducted from head sample weight and included as water addition weight.

Grind three test heads at pre-determined grind times to yield a range of grind product sizes. Desired product size, 35%+100 mesh, should fall within that range. Grind times vary depending on ore hardness; typical mine ore product size vs. grind time test grind times are 7, 10, and 13 minutes.

Wet screen the ground slurries over a 100 mesh (150 micron) Tyler sieve and dry the oversize fraction. Screen the dried oversize material for 10 minutes on a 100 mesh screen using a ro-tap screen shaker.

Product size vs. grind time test variations can yield valuable information. For example, to determine grind product gold and weight distribution relationship, grind product slurry can be screened over a 400 mesh screen. Both the oversize and undersize fractions can be dried and the oversize material screened over a range of screen sizes on the ro-tap machine with individual size fractions assayed. This information is used to determine gold extraction efficiency at different grind product sizes.

Lime is typically added during the bottle roll leach grind stage. Optimum grind stage lime addition quantity can be estimated by measuring grind product slurry pH following the first product size vs. grind time test where no lime is added to the grind feed sample. Based on that pH, some lime quantity is added to the second product size vs. grind time feed. Again, product slurry pH is measured. A third lime addition quantity is then estimated to achieve optimum grind product pH. Keep in mind that slurry pH will increase significantly with NaCN solution addition. Thus, grind product pH should be about 9.

Reagent Makeup

Reagents required to complete standard mine bottle roll leach tests include:
1. 5% NaCN solution
2. Silver Nitrate ($AgNO_3$) for NaCN titration (3.47 g/L)
3. Potassium Iodide (KI) for NaCN titration indicator (50 g/L)
4. Oxalic Acid for alkalinity titration (6.3 g/L)
5. Phenolphthalein for alkalinity titration indicator (1 g/500 mL)

Bottle Roll Leach

Determine grind water addition quantity based on head sample weight. Place the head sample, correct dilution water volume, and predetermined lime volume in the laboratory rod mill. Set the grind roll timer to the optimum grind time as determined during the product size vs. grind time stage. Start the grind roll. Once the grind rolls have stopped, wash the rod mill contents into a clean bucket using care to assure that all solid material is removed from the mill and rods.

Based on dry head sample weight, determine 5% NaCN solution volume. Record empty leach bottle weight and calculate 25% solids slurry weight and gross bottle weight following slurry, NaCN solution, and lime additions. Transfer the ground slurry from the bucket to the leach bottle. Place the leach bottle on the laboratory balance and add fresh water until gross weight is within about 100 grams of the predetermined gross weight. Add NaCN solution and check slurry pH.

Add lime in small increments until pH level reaches the target 11.3. Record lime addition quantity. Again with the leach bottle on the laboratory balance, add fresh water until the desired gross weight is reached. Place the leach bottle on the rolls and start the roll motor. Record time and ambient temperature. Repeat this process for each test.

NaCN concentration is measured and adjusted following the initial four hours of leach retention. Remove the bottle from the rolls, record gross weight, and place the bottle on the laboratory bench. Allow the slurry to settle to avoid drawing solids into the pipet tube. Sufficient settling typically occurs within ten minutes.

Withdraw 20 ml leach solution via pipetting and transfer the solution to a 100 ml glass beaker. Add four drops potassium iodide (KI) indicator. Add silver nitrate ($AgNO_3$) drop by drop until endpoint is reached and solution color changes from clear to pale green. The AgNO3 is mixed such than 0.5 ml is equivalent to 0.1 lb./ton solution NaCN. Thus, to calculate NaCN concentration in lbs./ton, multiply the $AgNO_3$ titration volume by 0.2.

Once NaCN concentration has been adjusted, check slurry pH and add lime as required to maintain pH 11.3. Finally, place the leach bottle on the laboratory balance and add fresh water to the achieve the original gross weight of 3,086.6 grams. The four hour NaCN titration process is repeated after 24 hours.

Filtering

After 48 hours, remove the leach bottle from the rolls and record gross weight, time, and ambient temperature. Set up a 10-inch Buckner funnel and 2000 ml filtering flask for each bottle slurry to be filtered. Record the weight of each sharkskin filter paper. Wet and center the paper in the Buckner funnel. Empty the entire contents of the leach bottle into a Buckner funnel. Tap the bottle bottom to remove as much solid material as possible. Connect a vacuum line to the flask and start the vacuum pump.

After all standing solution has drained into the flask, return the solution to the leach bottle. Shake the bottle to wash away any solids remaining on the bottle wall and bottom. Empty the entire contents of the leach bottle into a Buckner funnel. Filtering the solution twice will deliver a clean, clear solution for atomic absorption (AA) spectroscopy analyses. After all standing solution has again exited the filter cake, pour the flask contents into a ½ gallon sample bottle marked with the appropriate test number. Record solution pH and draw 20 ml solution from the sample bottle for final NaCN concentration and alkalinity determination. Submit the solution for atomic absorption (AA) spectroscopy analysis.

Next, pour 1,000 ml fresh water into the leach bottle. Shake the bottle to again remove any remaining solid particles and pour the bottle contents into the flask. The fresh water rinse will dilute and remove dissolved gold remaining in the filter cake. Once all standing solution has drained from the filter, repeat this step with an addition 1,000 ml rinse. Finally, pour the rinse solution into a ½ gallon sample bottle marked with the appropriate test number and submit for atomic absorption (AA) spectroscopy analysis. Place the filter cake in the drying oven.

Using the 20 ml solution drawn from the pregnant solution sample as mentioned above, titrate with AgNO3 to determine final NaCN concentration. Once the NaCN titration endpoint has been reached and AgNO3 volume recorded, add two drops phenolphthalein indicator to the pale green sample. Phenolphthalein addition will turn the pale green solution purple. Add oxalic acid drop by drop until the solution returns to pale green, thus indicating endpoint. Record oxalic acid addition volume.

Residue Sample Preparation

Once the filter cake has dried, place the cake and filter paper on the laboratory balance, subtract the filter paper weight to determine dry residue weight, and record dry residue weight. Roll the cake until broken up sufficiently to freely pass the riffle splitter. Split approximately 75 grams from the cake sample to submit for fire assay. Place the remaining sample portion in an appropriately marked sample bag.

Final Calculations

Sodium cyanide consumption is simply the total NaCN addition quantity less the quantity remaining in solution.

Final Calculations

Gold recovery is calculated based on actual head assay and calculated head assay.

Recovery based on actual head assay is 1 minus the residue assay divided by the head sample assay. Since residue and head weights are the same (less dissolved gold weight), gold recovery based on head assay is calculated as:

$$Rec=(1-(R\div H))\times 100\%$$

Where Rec=Gold Recovery
R=Residue Assay
H=Head Assay

Recovery based on calculated head assay is determined using leach residue and solution assays. First estimate the calculated head value:

$$C=(S_A\times S_W+R_A\times R_W)\div R_W$$

Where C=calculated head assay
$S_A$=Solution Assay
$S_W$=Solution Weight
$R_A$=Residue Assay
$R_W$=Residue Weight Recovery is calculated by dividing total gold quantity in solution by calculated head gold quantity as follows:

$$Rec=S_A\times S_W\div C_A\times C_W\times 100\%$$

The recovery data generated are summarized in the Table for Control (no additive), Control (modified lignosulfonate additive) and Invention (PAA additive) examples. Tests were conducted at 60% grinding density and various leaching densities, i.e. 25%, 40% and 50%. For all leaching density scenarios, the PAA additive tests resulted in higher gold recoveries as compared to Control tests. The relative gain in gold recovery was more pronounced at 50%, the highest, leaching density tested with nearly 7% gain in gold recovery over no additive Control. The lower leaching densities tests showed as well gain in gold recovery with PAA additive, but much more modest, i.e. around 1.6%-2.2%. Interestingly, using modified lignosulfonate additive, Control Examples 1A-1F, resulted in decrease in gold recovery over Control Examples 1G-1L without additive.

The data set forth in this disclosure demonstrate that using particular additives can significantly improve gold recovery when added directly to a cyanide leaching circuit, e.g. gold ore slurry in cyanide leaching tanks containing active carbon, in mining. The effect relates to wt. % gold ore slurry in water and tends to improve at higher slurry wt. %. This discovered effect is not obvious because the presence of any additives in leaching circuits typically is not desirable due to potential additive adsorption onto carbon thereby blocking the active carbon surface and preventing, or at least minimizing, gold recovery via gold-cyanide complex adsorption onto active carbon. This is known in the industry as carbon "poisoning" or a CIL "poisoning" effect. It is also not obvious in light of potential interaction of an additive with cyanide ion reducing cyanide anion activity and, hence, Au leaching efficacy. The instant additive unexpectedly improves recovery and is superior to known methods and additives.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of improving gold recovery in a cyanide leaching circuit comprising a gold ore slurry, said method comprising the steps of:
providing a gold recovery additive that is polyacrylic acid, wherein the additive has a weight average molecular weight of from about 500 to about 10,000 g/mol;
combining the gold recovery additive with the gold ore slurry in the cyanide leaching circuit, wherein the gold recovery additive is present in an amount of from about 10 to about 1000 g per ton of dry gold ore to improve the recovery of gold from the gold ore slurry.

2. The method of claim 1 wherein the polyacrylic acid has a weight average molecular weight of about 1,000 to about 6,000 g/mol.

3. The method of claim 1 wherein the polyacrylic acid has a weight average molecular weight of about 2,000 to about 4,000 g/mol.

4. The method of claim 1 wherein the gold ore slurry has a grind density of from about 50 to about 80 percent of solids based on a total weight of the slurry.

5. The method of claim 4 wherein the gold ore slurry has a leach density of from about 25 to about 50 percent of solids based on a total weight of the slurry.

6. The method of claim 5 wherein the gold recovery additive is present in an amount of from about 100 to about 700 g per ton of dry gold ore.

7. The method of claim 1 wherein the gold ore slurry has a grind density of from about 50 to about 80 percent of solids based on a total weight of the slurry.

8. The method of claim 7 wherein the gold ore slurry has a leach density of from about 25 to about 50 percent of solids based on a total weight of the slurry.

9. The method of claim 1 wherein the gold ore slurry has a leach density of from about 25 to about 50 percent of solids based on a total weight of the slurry.

10. The method of claim 1 wherein the gold recovery additive is present in an amount of from about 100 to about 700 g per ton of dry gold ore.

11. The method of claim 1 wherein the gold recovery additive is present in an amount of from about 60 to about 650 g per ton of dry gold ore.

12. The method of claim 1 wherein the step of combining occurs in a leaching tank of a carbon-in-leach or carbon-in-pulp process.

13. The method of claim 1 wherein the step of combining occurs during a step of slurry pumping in the cyanide leaching circuit of a carbon-in-leach or carbon-in-pulp process.

14. The method of claim 1 wherein the gold recovery additive and the gold ore slurry are free of an oil.

15. The method of claim 1 wherein the gold recovery additive and the gold ore slurry are free of a cationic surfactant.

16. The method of claim 1 wherein the step of combining occurs in a leaching tank of a carbon-in-leach or carbon-in-pulp process, wherein the gold ore slurry has a leach density of from about 25 to about 50 percent based on a total weight of the slurry, wherein the gold slurry has a grind density of about 60 percent based on a total weight of the slurry, and wherein the gold recovery additive and the gold ore slurry are free of an oil and a cationic surfactant.

17. The method of claim 1 wherein the step of combining occurs in a leaching tank of a carbon-in-leach or carbon-in-pulp process, wherein the gold ore slurry has a leach density of from about 25 to about 50 percent based on a total weight of the slurry, wherein the gold slurry has a grind density of about 60 percent based on a total weight of the slurry, wherein the polyacrylic acid has a weight average molecular weight of about 2,000 to about 4,000 g/mol, and wherein the gold recovery additive and the gold ore slurry are free of an oil and a cationic surfactant.

18. The method of claim 1 wherein the step of combining occurs in a leaching tank of a carbon-in-leach or carbon-in-pulp process, wherein the gold ore slurry has a leach density of from about 25 to about 50 percent based on a total weight of the slurry, wherein the gold slurry has a grind density of about 60 percent based on a total weight of the slurry, wherein the polyacrylic acid has a weight average molecular weight of about 2,000 to about 4,000 g/mol, wherein the gold recovery additive is present in an amount of from about 600 to about 650 g per ton of dry ore, and wherein the gold recovery additive and the gold ore slurry are free of an oil and a cationic surfactant.

19. The method of claim 18 wherein the slurry has a pH of from about 10 to about 12, a cyanide concentration of not less than about 0.015 wt. %, and a slurry concentration of from about 40 to about 45 wt % solids dry ore and wherein the slurry further comprises activated carbon having a particle size of from about 1.0 to about 3.35 mm and coconut shell activated carbon.

20. The method of claim 1 wherein the slurry has a pH of from about 10 to about 12, a cyanide concentration of not less than about 0.015 wt. %, and a slurry concentration of from about 40 to about 45 wt % solids dry ore and wherein the slurry further comprises activated carbon having a particle size of from about 1.0 to about 3.35 mm and coconut shell activated carbon.

* * * * *

UNITED STATES PATENT AND TRADEMARK OFFICE
CERTIFICATE OF CORRECTION

PATENT NO. : 12,000,015 B2
APPLICATION NO. : 17/216789
DATED : June 4, 2024
INVENTOR(S) : Bakeev Page 1 of 1

It is certified that error appears in the above-identified patent and that said Letters Patent is hereby corrected as shown below:

In the Claims

In Claim 13, Column 14, Line 41:
Replace 60 with 600

Signed and Sealed this
Twenty-fifth Day of March, 2025

Coke Morgan Stewart
*Acting Director of the United States Patent and Trademark Office*